United States Patent [19]

Klose et al.

[11] 4,451,911
[45] May 29, 1984

[54] INTERACTIVE COMMUNICATING TOY FIGURE DEVICE

[75] Inventors: George J. Klose, Lomita; Janice E. Rosenthal, Manhattan Beach; Thomas G. Schneider, Venice; Robert F. Schroeder, Long Beach, all of Calif.

[73] Assignee: Mattel, Inc., Hawthorne, Calif.

[21] Appl. No.: 345,285

[22] Filed: Feb. 3, 1982

[51] Int. Cl.³ .................. A63H 3/28; A63H 33/26; G11B 17/22
[52] U.S. Cl. .................................. 369/31; 46/232; 434/335; 369/41; 369/65; 369/66; 369/64
[58] Field of Search ............... 46/232; 434/335; 364/188, 189; 369/30, 31, 32, 33, 41, 64, 65, 66, 69, 70, 76

[56] References Cited

U.S. PATENT DOCUMENTS

| | | | |
|---|---|---|---|
| 2,733,425 | 1/1956 | Williams et al. | 360/78 |
| 3,017,187 | 1/1962 | Ryan | 369/66 |
| 3,145,268 | 8/1964 | Whitney et al. | 360/106 |
| 3,156,906 | 11/1964 | Cummins | 360/77 |
| 3,178,188 | 4/1965 | Lea | 369/31 |
| 3,292,932 | 12/1966 | Wolf | 369/31 |
| 3,461,604 | 8/1969 | Glass et al. | 46/232 |
| 3,466,050 | 9/1969 | Sindlinger | 369/31 |
| 3,605,285 | 9/1971 | BenDaniel et al. | 434/318 |
| 3,631,421 | 12/1971 | Perkins | 360/48 |
| 3,711,964 | 1/1973 | Folson et al. | 434/318 |
| 3,871,112 | 3/1975 | Licitis | 434/318 |
| 3,924,268 | 12/1975 | McIntosh et al. | 360/78 |
| 3,994,016 | 11/1976 | Moghadam | 360/77 |
| 4,016,603 | 4/1977 | Ottesen | 360/135 |
| 4,078,316 | 3/1978 | Freeman | 434/319 |
| 4,135,086 | 1/1979 | Baba | 250/237 G |
| 4,193,210 | 3/1980 | Turnquist | 434/335 |
| 4,230,323 | 10/1980 | Tsuji et al. | 369/33 |
| 4,249,338 | 2/1981 | Wexler | 46/232 |
| 4,267,551 | 5/1981 | Dankman et al. | 46/232 |
| 4,352,664 | 10/1982 | Morrison et al. | 434/44 |

Primary Examiner—D. McElheny, Jr.
Attorney, Agent, or Firm—Ronald M. Goldman; Max E. Shirk; Roy A. Ekstrand

[57] ABSTRACT

An electronic toy doll including electronic control circuitry responds to selection of one of a plurality of switches on the doll housing and selects associated vocal messages. The control circuitry includes a stored program of instructions and also permits a problem-solution mode of operation where the user is given a message selected by a weighted probability of the occurrence of a problem and then the doll responds according to how the user correctly or incorrectly responds to the various switch response operations possible.

9 Claims, 18 Drawing Figures

INTERACTIVE COMMUNICATING TOY FIGURE DEVICE

BACKGROUND OF THE INVENTION

Field of the Invention

The present invention pertains generally to the field of interactive communicating devices and more particularly, to an improved computerized record player of the type disclosed in copending application Ser. No. 06/187,108, now abandoned, which was filed Sept. 15, 1980 and which was assigned to the assignee of the instant application.

SUMMARY OF THE INVENTION

It is the object of the present invention to provide a new and useful interactive communicating device.

It is another object of the present invention to provide a computerized record player which will automatically play one or more appropriate messages following a message played in response to actuation of the record player by a user.

It is the further object of the present invention to provide a new and useful computerized record player in combination with a figure toy.

According to the present invention, an interactive communicating device comprises a housing, apparatus mounted in the housing for storing a plurality of audible messages, play apparatus connected to the message storing apparatus for selectively playing individual ones of the plurality of audible messages, a plurality of switches located on the housing and control apparatus including a central processor, having a stored program of coded instructions, coupled to the switches and the play apparatus.

The control apparatus may also include apparatus for operating the device in a first mode in which each of the switches within the plurality of switches causes the play apparatus to play a particular one of the audible messages, apparatus for operating the device in a second mode in which a plurality of problem-solution pairs are established wherein a selected message is played announcing a problem and a corresponding one of the switches is exclusively enpowered to effect proper solution, including apparatus for establishing a weighted probability of the occurrence of the problems, and mode control apparatus for changing between the first and second modes of operation.

In the best mode presently contemplated for carrying out the invention, the interactive communicating device is a doll and the housing is a body resembling a human infant. The doll may include automatic shut off apparatus, operative in the second mode, which portrays an infant crying itself to sleep by establishing a time interval and deactivating the control apparatus in the absence of switch operation during the time interval.

The play apparatus may comprise a phonograph including a record, a tonearm and a speaker mechanically coupled to the tonearm.

The features of the present invention which are believed to be novel are set forth with particularity in the appended claims.

The present invention, both as to its organization and operation, together with further objects and advantages thereof, may best be understood by reference to the following description, taken in connection with the accompanying drawings in which like reference characters refer to like elements in the several views.

In the following detailed description of the presently-preferred embodiment of the invention, we shall refer to certain structures which might be adopted into practice of our invention, but have by no means attempted to specify all which may be employed, the object and intent of the description being mainly to instruct others in the best mode presently contemplated by us for carrying out the invention and to enable them to fully comprehend its nature and general character. It is to be understood that specific mention of some modifications is in no way intended to exclude others not referred to but which reside within the spirit and scope of the invention, viewed in its broadest aspect, and as defined in the appended claims.

DETAILED DESCRIPTION OF THE PREFERRED EMBODIMENT

Referring again to the drawings and more particularly, to FIGS. 1-7, a computerized record player constituting a presently-preferred embodiment of the invention, generally designated 10, may be mounted inside a doll 11 and includes a disc-type phonograph record 12 having a plurality of recorded grooves 14 (FIG. 5), a lead-in groove 16 and a run-out groove 18 for each recorded groove. As shown herein for purposes of illustration, but not of limitation, recorded grooves are provided on the upper surface 19 of record 12 and they may contain suitable recorded information, such as recorded messages or short sayings. Lead-in grooves 16 are also provided and they are uniformly spaced about the periphery of record 12.

Record player 10 also includes a tonearm assembly 20 having a first end 22, which is provided with an aperture 23, and a second end 24 from wihch a phonograph needle 26, a pin 27 and a finger 28 depend. End 24 of tonearm 20 carries a transverse rib 29 for accoustically coupling tonearm 20 to the fluid coupling 30 (FIG. 3) on a speaker cone 31 mounted underneath the top wall portion 32 of an upperhousing portion 33 of a record player 10. Tonearm assembly 20, which may be made from a suitable polymeric material, is swingably mounted in a lower housing portion 34 of record player 10 on a suitable post 36.

Record player 10 also includes a solenoid 38 having a coil 40, a fixed armature 42, a movable field piece 43, and a tonearm support 44, all of which may be mounted in lower housing portion 34 adjacent the outer periphery of phonograph record 12. Record 12 includes a lower surface 46 (FIG. 1) from which a hollow boss 48, a plurality of reinforcing ribs 50 and a plurality of optical teeth 52 depend. A spindle 54 may be used to rotatably mount record 12 in phonograph 10 by engaging the lower end of spindle 54 in a hollow boss 56 in lower housing portion 34 and the upper end of spindle 54 in a hollow boss 58 (FIG. 3) provided in the upper housing portion 33. Teeth 52 will then be in a position to be read by an optical encoder 60 (FIG. 1) including an infra-red LED 62 and a phototransistor 64 which are connected to a microprocessor 66 by circuits to be hereinafter described. Teeth 52 correspond in number and location to lead-in grooves 16 and include a reference tooth 52A which is positioned between two teeth 52 for establishing a point of reference with respect to the rotated position of record 12. Microprocessor 66 may comprise a microcontroller of the type set forth in the attached 16 pages of National Semiconductor Corporation data sheets dated January 1980 and entitled *COP410L-/COP411L SINGLE-CHIP N-CHANNEL MICROCONTROLLERS*. The Source Code for microprocessor 66 is attached hereto and is identified by a heading reading "This is the ROM version of the BABY-X Code".

Figure 2:
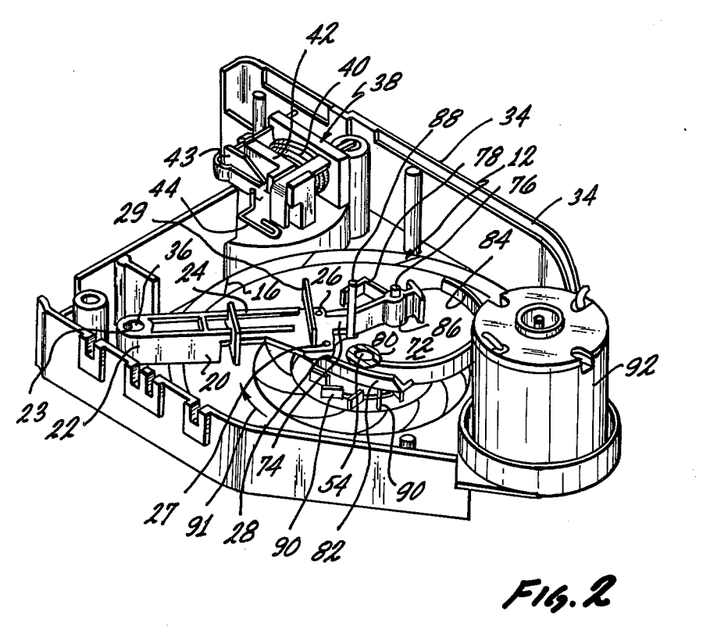
FIG. 2 is a perspective view of the record player of FIG. 1 with the upper housing removed to show internal construction.
Figure 3:
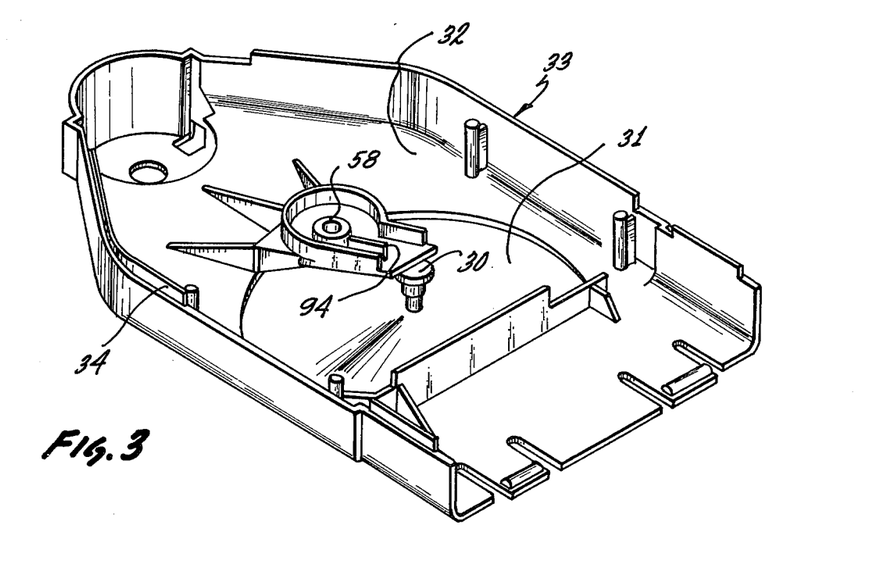
FIG. 3 is a bottom perspective view of the upper housing.
Figure 4:
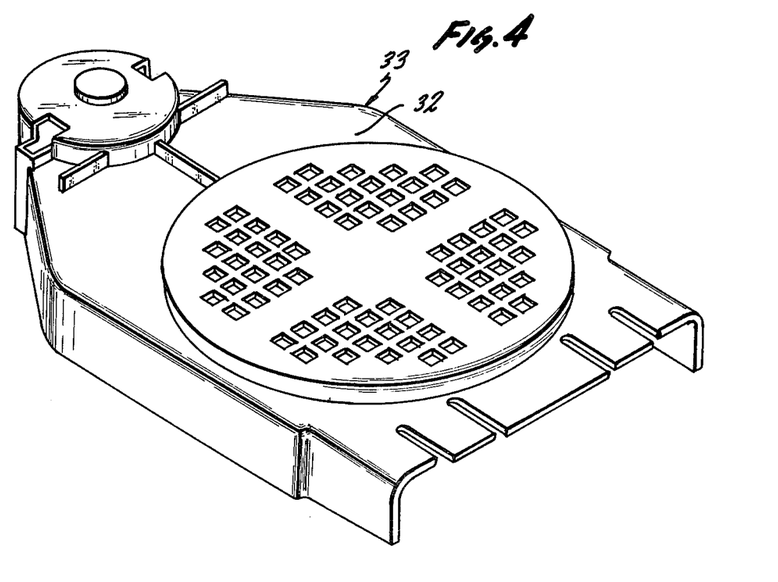
FIG. 4 is a top perspective view of the upper housing.
Figure 5:
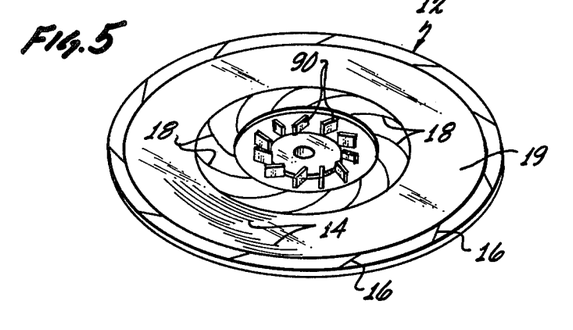
FIG. 5 is a top perspective view of the record partially shown in FIG. 1.
Figure 6:
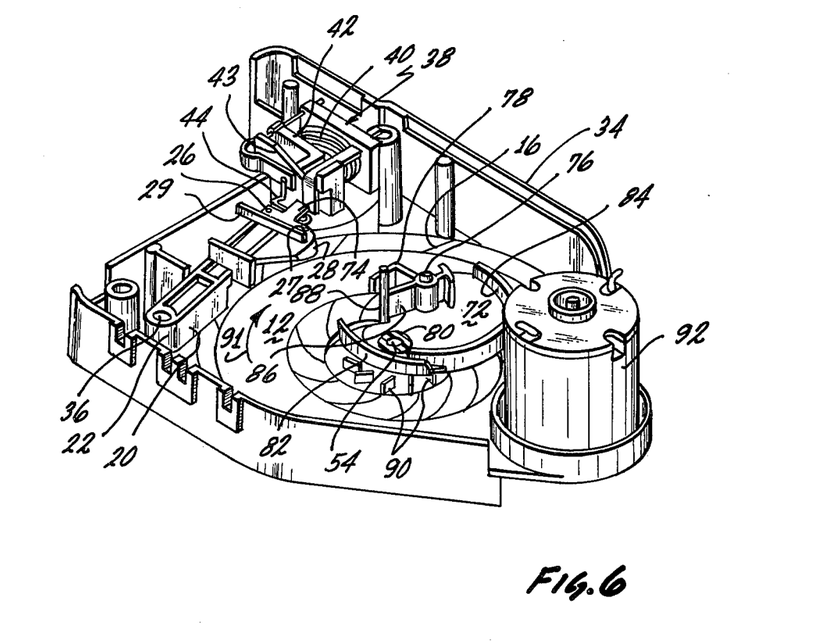
FIG. 6 is a perspective view similar to FIG. 2 showing the tonearm in its at-rest position.
Figure 7:
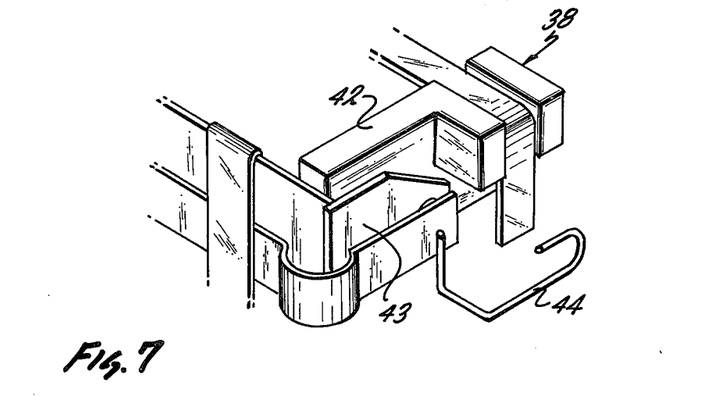
FIG. 7 is an enlarged, partial perspective view of the mechanism for holding the tonearm in its FIG. 6 position.

Referring now to FIGS. 2 and 6, record player 10 also includes a snail-type cam 72 which is rotatably mounted on spindle 54 on the upper surface 19 of record 12 for returning tonearm 20 from its FIG. 2 position at the center of record 12 to its FIG. 6 position adjacent the outer periphery of record 12 where a protuberance or tab 74, which extends from end 24 of tonearm 20, rests on top of tonearm support 44 for supporting needle 26 immediately above lead-in grooves 16. Cam 72 may be molded from a suitable polymeric material and includes a fixed post 76, an L-shaped stop member 78, a hollow boss 80, a first arcuate rib 82 and a second arcuate rib 84. A cam lock 86 is swingably mounted on post 76 and carries a pin 88 depending into the path-of-travel of a plurality of upstanding plates 90 encompassing the center portion of record 12. When tonearm 20 travels from its FIG. 6 position to its FIG. 2 position, tab 74 engages pin 88 and drives it into engagement with one of the upstanding plates 90 thereby locking cam 72 to record 12 for rotation therewith as it is driven in a clockwise direction, as indicated by arrow 91, by an electric motor 92. Arcuate rib 82 then engages tonearm 20 between depending pin 27 and finger 28, lifts needle 26 from record 12 and directs tonearm 20 onto arcuate rib 84 which then carries tonearm 20 to the outer periphery of record 12 and deposits tonearm tab 74 on tonearm support 44. Pin 88 on cam lock 86 is prevented from drifting clockwise beyond the path-of-travel of tab 74 by stop member 78 and a rib 94, which is provided on the lower surface 32 of upper housing 33 (FIG. 3).

Figure 8:
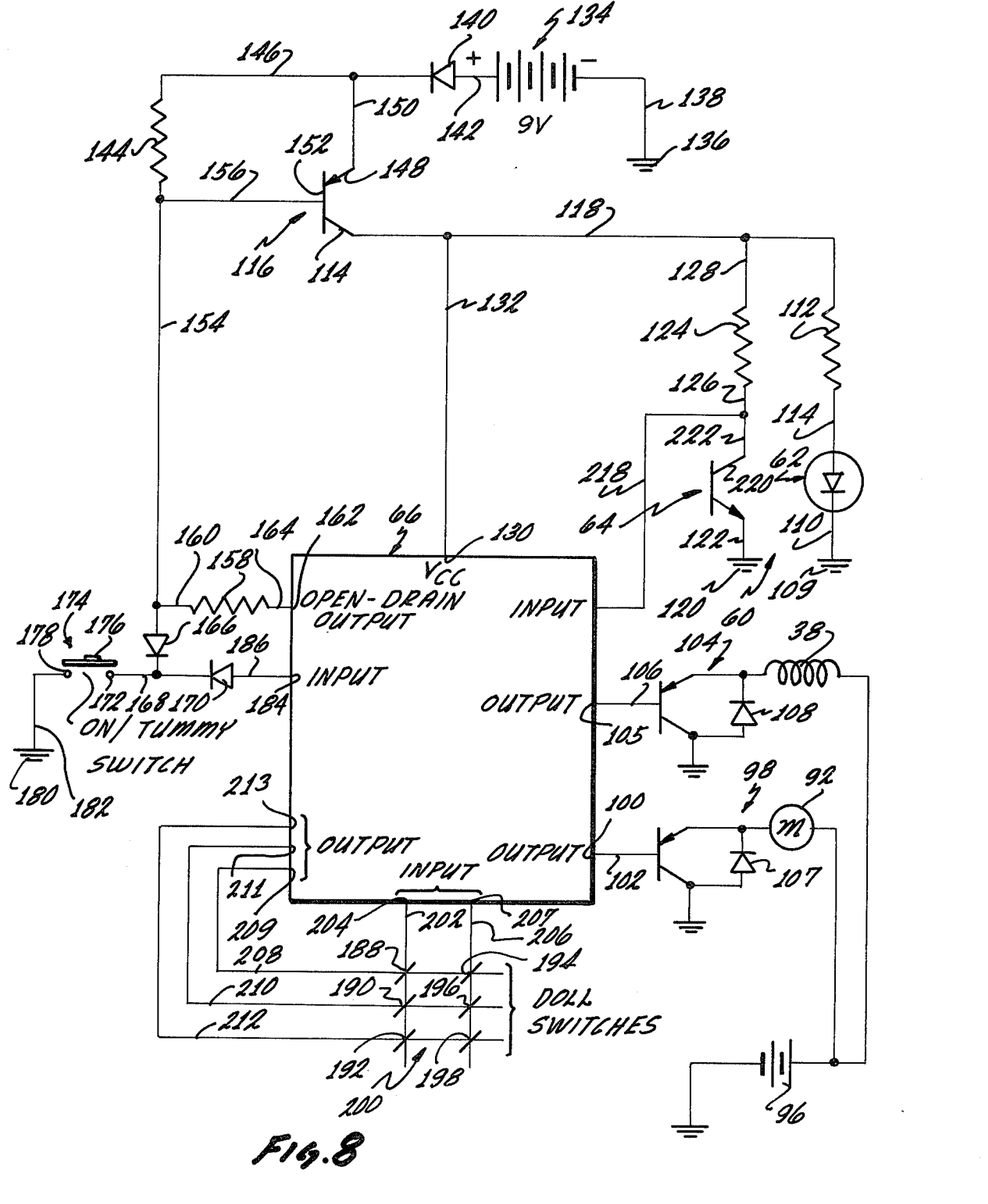
FIG. 8 is a wiring diagram of the computerized control for the record player.

Referring now to FIG. 8, solenoid 38 and motor 92 receive power from a three-volt battery 96. Motor 92 is switched by microprocessor 66 by means of a pnp transistor 98 having its base connected to output 100 on microprocessor 66 by a lead 102.

Solenoid 38, which is also powered from battery 96, is switched by a pnp transistor 104 connected to output 105 on microprocessor 66 by a lead 106. Transistors 98 and 104 may be protected from the generation of a back emf by diodes 107, 108, respectively.

Infra-red LED 62 is connected to a ground 109 by a lead 110 and to a resistor 112 by a lead 114. Resistor 112 is connected to the collector 114 in a pnp transistor 116 by a conductor 118.

Phototransistor 64 is connected to a ground 120 by a lead 122 and to a resistor 124 by a lead 126. Resistor 124 is connected to conductor 118 by a lead 128. Conductor 118 is connected to the Vcc 130 on microprocessor 66 by a lead 132 for supplying power to encoder 60.

A 9 volt battery 134 is connected to a ground 136 by a lead 138 and to a polarity-protection diode 140 by a lead 142. A resistor 144 is connected to diode 140 by a conductor 146. The emitter 148 on transistor 116 is connected to conductor 146 by a lead 150 and the base 152 in transistor 116 is connected to a conductor 154 below resistor 144 by a lead 156. A resistor 158 is connected to conductor 154 by a lead 160 and to the open-drain output 162 in microprocessor 66 by a lead 164. An enabling diode 166 connects conductor 154 to a lead 168 having one end connected to a second enabling diode 170 and its other end connected to a pole 172 on a normally-open, momentary switch 174 which includes a pushbutton 176 and a second pole 178. Pole 178 is connected to a ground 180 by a lead 182. Diode 170 is connected to an input 184 in microprocessor 66 by a lead 186.

Figure 1:
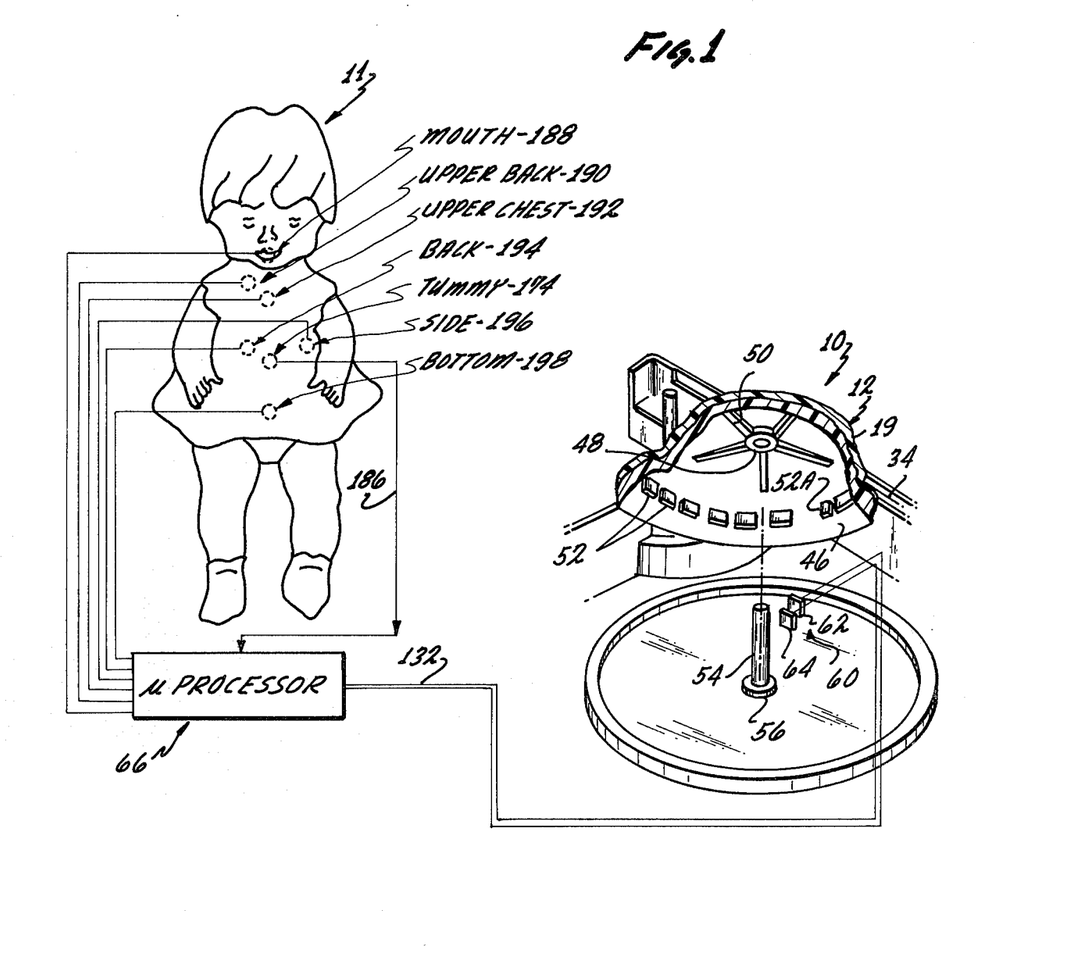
FIG. 1 is an exploded, partial perspective view of a computerized record player constituting a presently-preferred embodiment of the invention in combination with a doll, which is shown in front elevation, and the switches, wiring and microprocessor for the record player, which are shown schematically.

Referring now to FIG. 1, switch 174 may be suitably mounted on the stomach of doll 11 and may be referred to as a "tummy" switch. A mouth switch 188, an upper backswitch 190, an upper chest switch 192, a back switch 194, a side switch 196 and a bottom switch 198 are also provided on doll 11. These are shown collectively in FIG. 8 as a switch matrix 200.

A lead 202 connects switches 188, 190 and 192 to an input 204 in microprocessor 66 and a lead 206 connects switches 194, 196 and 198 to an input 207. A conductor 208 connects an output 209 in microprocessor 66 to switches 188 and 194; a conductor 210 connects an output 211 to switches 190 and 196 and a conductor 212 connects an output 213 to switches 192 and 198. Lead 126 is connected to an input 216 by a lead 218 and to a collector 220 in phototransistor 64 by a lead 222.

A subroutine may be used for finding and playing sound tracks on record 12. The sound-select subroutine receives a track number from the main program and finds and plays the track. After the track has finished playing and record player 10 has mechanically reset itself, control is returned to the main program. Switch inputs from doll 11 are read during the play mode and the last valid input is returned.

Figure 9A:
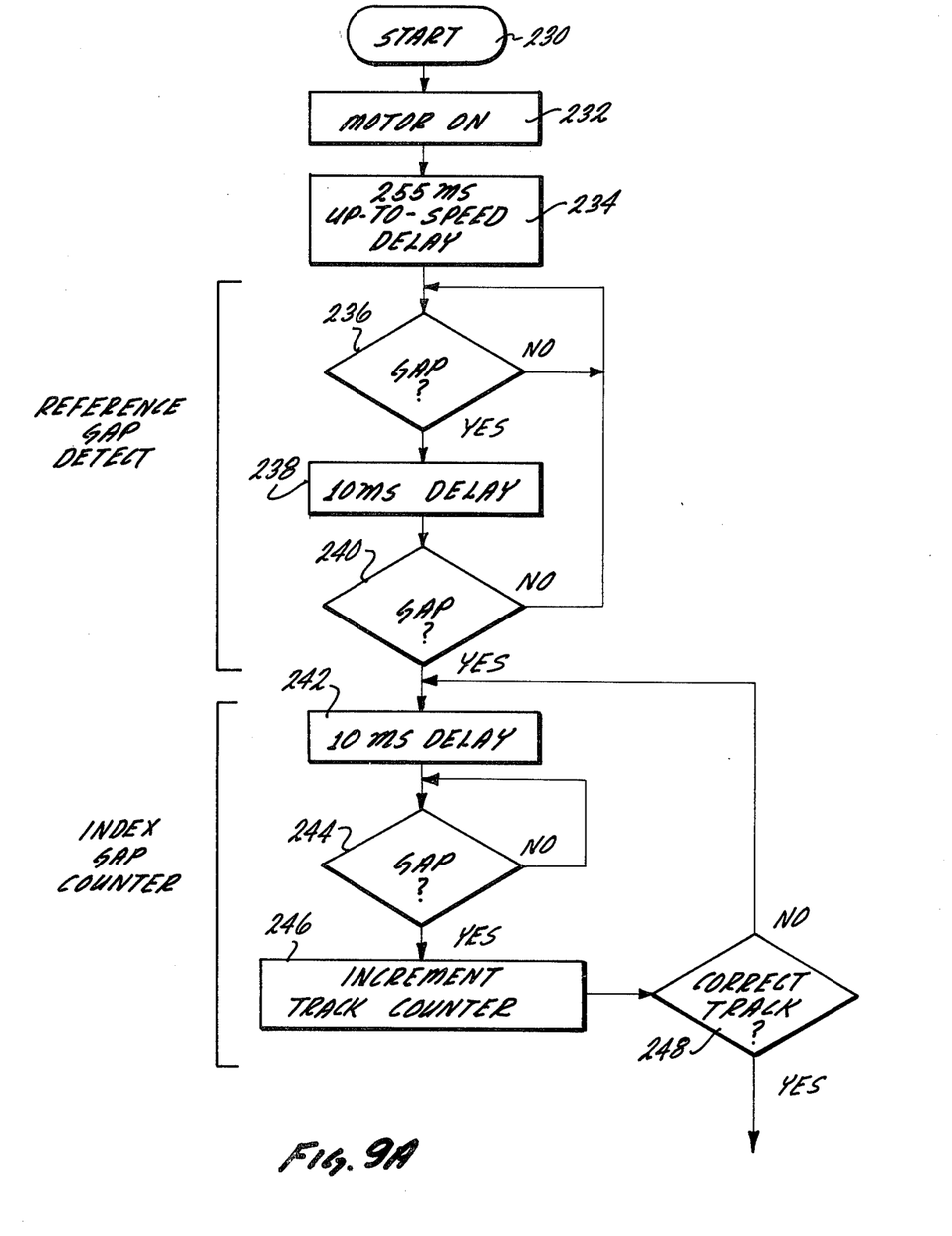
FIGS. 9A-9B together comprise a flow chart illustrating the sequence of operations performed by the circuitry of the record player of FIG. 1 during a sound-select subroutine.
Figure 9B:
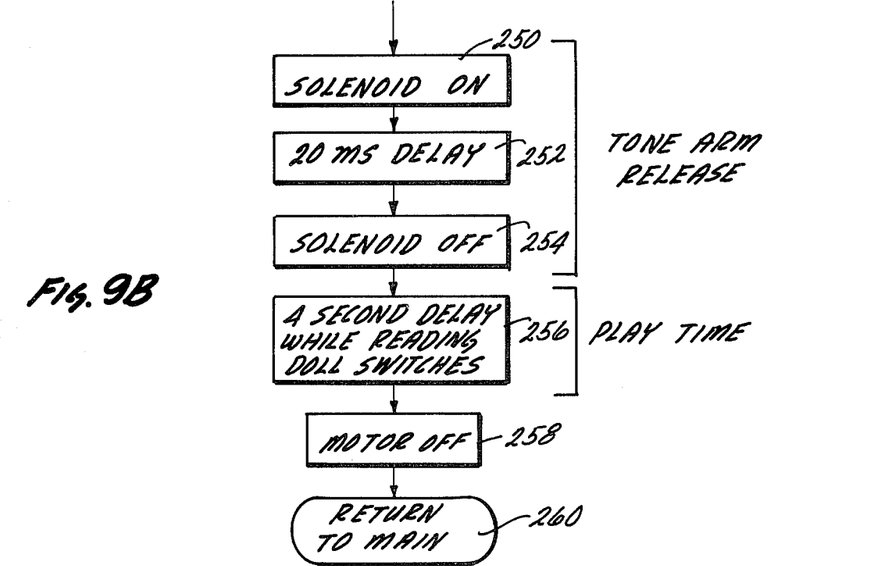

The flowchart for this sound-select subroutine will now be described in connection with FIGS. 9A and 9B. Tummy button or switch 174 may be momentarily depressed to activate the power switching circuit in microprocessor 66, as indicated by step 230. Once the microprocessor senses that power is up, it latches the power switching circuit on. Assuming that tonearm 20 is in the position shown in FIG. 6 so that tab 74 will be supported by support 44, one of the other buttons may be depressed on doll 11 moving the program to step 232 where motor 92 is switched on. The program then proceeds to step 234 where a delay of 255 ms is executed while motor 92 comes up to speed whereupon the program moves to step 236. Optical encoder 60 then starts generating electric signals corresponding to the location of each lead-in groove 16. The input from phototransistor 64 is then continuously read and debounced with an 18 μs time constant. If a gap is not detected between teeth 52, the program keeps recycling to the beginning of step 236 until a gap is detected. When a gap is detected, the program proceeds to step 238 where a 10 ms delay is executed, whereupon the program moves to step 240. If no gap is detected, the program again recycles to step 236. If another gap is read at step 240, it means that the double gap at reference 52A has been detected and the program moves to step 242 where another 10 ms delay is executed. The program then moves to step 244 where all succeeding gaps are counted as valid track indices. If no gap is detected, the program returns to the beginning of step 244.

If a gap is detected by encode 60 at step 244, the program moves to step 246 where a track counter is incremented whereupon the program branches to step 248 to determine whether or not a correct track was incremented. If an incorrect track was incremented, the program recycles to step 242 for another 10 ms delay. As each single gap is detected, a 10 ms delay is executed to prevent the same gap from being read twice. If it is determined at step 248 that a correct track was incremented at step 246, the program progresses to step 250 where solenoid 38 is enabled causing armature 42 to attract field piece 43 moving tonearm support 44 away from tab 74. This lowers needle 26 into the selected lead-in groove 16. The program then moves to step 252 for a 20 ms delay at the end of which the program moves to step 254 where solenoid 38 is de-energized. The program then proceeds to step 256 where there is a 4 second delay while doll switches 200 are read and while needle 26 tracks the selected recording inwardly to a run-out groove 18 whereupon cam 72 returns tab 74 to support 44. The program then moves to step 258 and motor 92 is de-energized whereupon the sub-routine moves to step 260 and returns to the main program.

Doll 11 will normally be running in "open" mode. This means that any switch depression gets an immediate response. The "open" mode routine will now be described in connection with FIG. 10A.

Figure 10A:
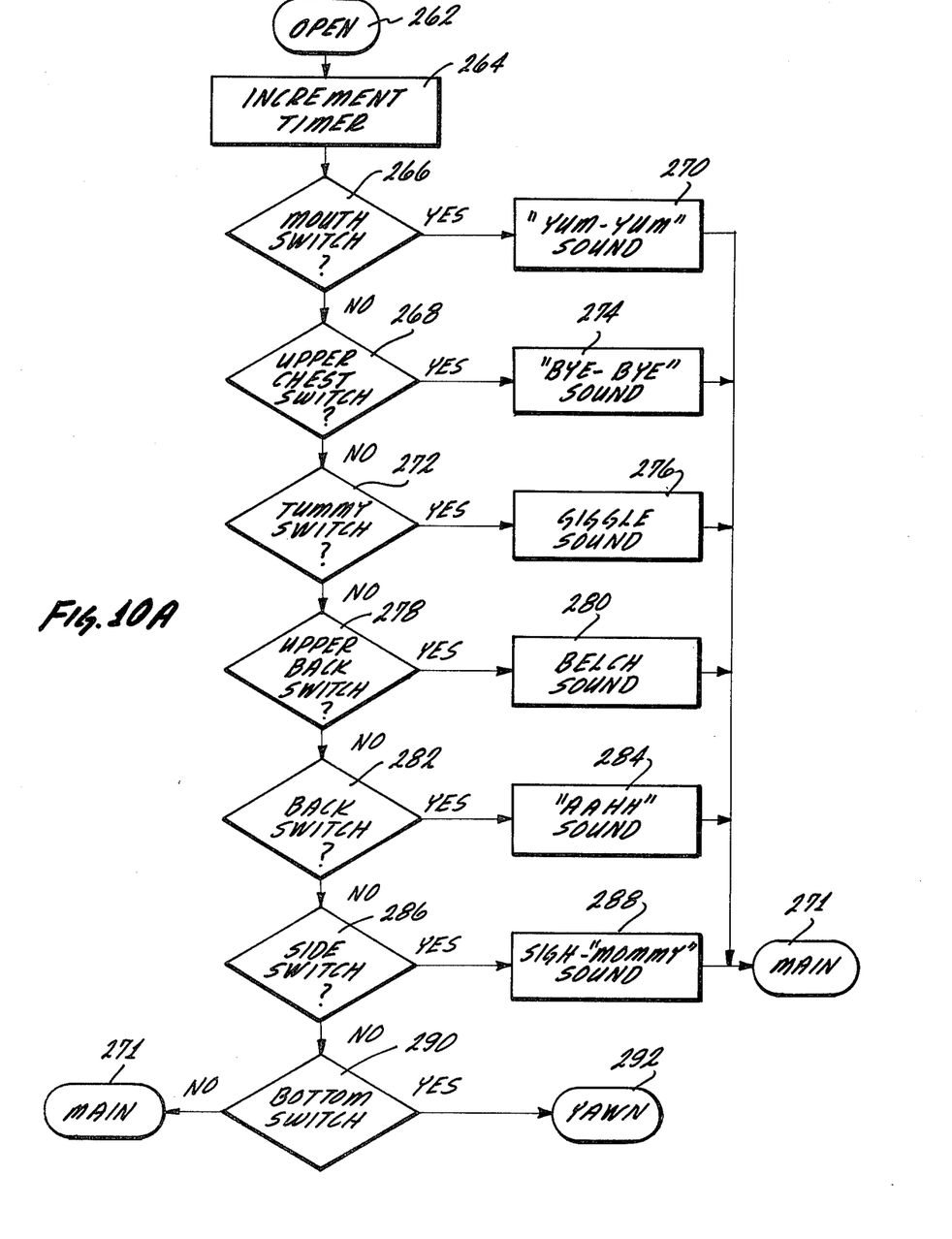
FIGS. 10A-10H together comprise a flow chart illustrating the sequence of operations performed by the circuitry of the computerized record player and doll of FIG. 1.

The program starts at step 262 where it may be assumed that switch 174 has been momentarily depressed and that power is up. The program then moves to step 264 where a timer is incremented and the program progresses to step 266 to ascertain if mouth switch 188 has been actuated. If not, the program proceeds to step 268 to ascertain if upper chest switch 192 has been actuated. If it is determined at step 266 that the mouth switch 188 was actuated, the program branches to step 270 where record player 10 plays a "yum-yum" sound. The program then returns to the main program (step 271).

If it is determined at step 268 that upper chest switch 192 was not actuated, the program moves to step 272 to determine if the tummy switch 174 was actuated. If, on the other hand, it was determined at step 268 that upper chest switch 192 was actuated, the program branches to step 274 where record player 10 plays a "bye-bye" sound. The program then returns to step 271, the main program.

If it is determined at step 272 that tummy switch 174 was actuated, the program branches to step 276 where record player 10 plays a suitable giggle sound. The program then returns to the main program. If it was determined at step 272 that tummy switch 174 was not actuated, the program progresses to step 278 to determine if upper back switch 190 was actuated. If upper back switch 190 was actuated, the program branches to step 280 and phonograph 10 plays a suitable belch sound. The program then recycles to the main program. If upper back switch 190 was not actuated, the program moves to step 282 to determine if back switch 194 was actuated.

If it is determined at step 282 that back switch 194 was actuated, the program branches to step 284 where phonograph 10 plays an "aahh" sound. The program then recycles to the main program. If it is determined at step 282 that back switch 194 was not actuated, the program moves to step 286 to determine if side switch 196 was actuated; if so, the program branches to step 288 where phonograph 10 plays a sigh sound and says, "Mommy". The program then recycles to the main program. If it is determined at step 286 that side switch 196 was not actuated, the program progresses to step 290 to determine if bottom switch 198 was actuated; if so, the program branches to step 292 from whence the program moves to step 293 (FIG. 10B) where phonograph 10 plays a yawning sound followed by a "night-night" sound. The program then moves to a power-off condition at step 294 to tell the child-user that doll 11 has gone to sleep. If it is determined at step 290 that bottom switch 198 was not actuated, the program recycles to step 271, the main program.

Figure 10B:
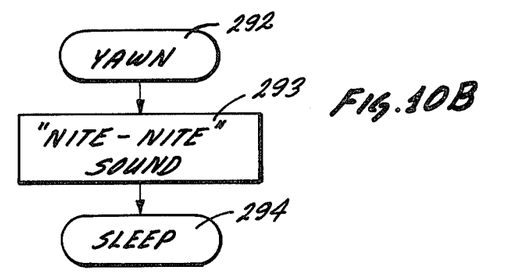
Figure 10C:
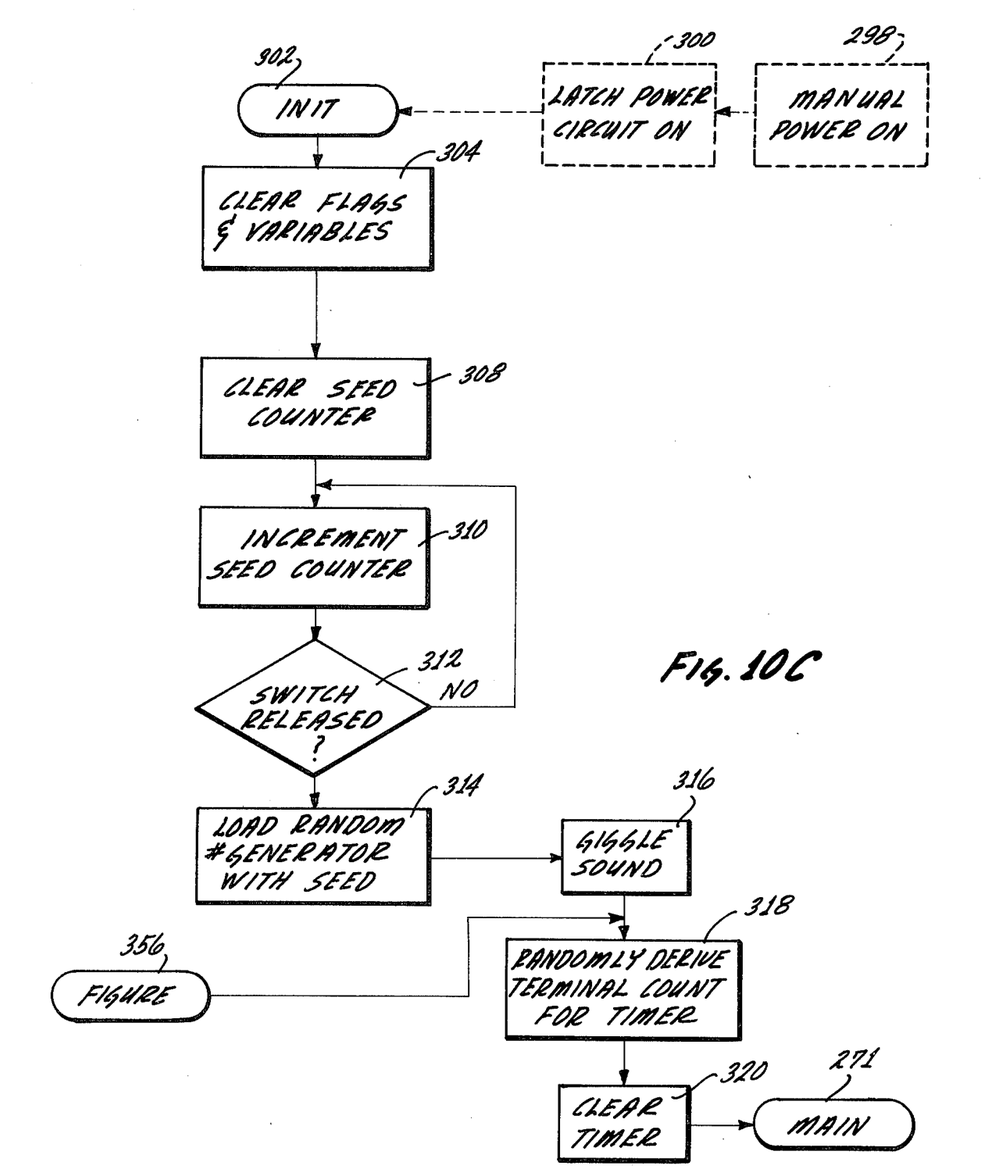

Referring now to FIG. 10C, doll 11 appears to the child-user to have a mind of its own. It develops problems that must be solved. The problems occur randomly in time and require specific solutions.

To "awaken" doll 11 and start the play, switch 174 must be actuated, as indicated at step 298, the manual power-on step. The program then moves to step 300 where the power circuit is latched on. The program then moves to step 302 where microprocessor 66 is enabled, whereupon the program moves to step 304 where flags and variables are cleared. The program progresses to step 308 where a seed counter is cleared. The program then moves to step 310 where the seed counter is incremented, whereupon the program moves to step 312 to determine if switch 174 has been released; if not, the program recycles to step 310 and the seed counter is again incremented. If switch 174 was released at step 312, the program moves to step 314 where a random number generator is loaded with a seed derived by counting the length of time switch 174 was depressed. The program then moves to step 316 where phonograph 10 plays a giggle sound. The program then progresses to step 318 where a terminal count is randomly derived and the software timer is cleared. The program then recycles to step 271 to initiate the main program.

Figure 10D:
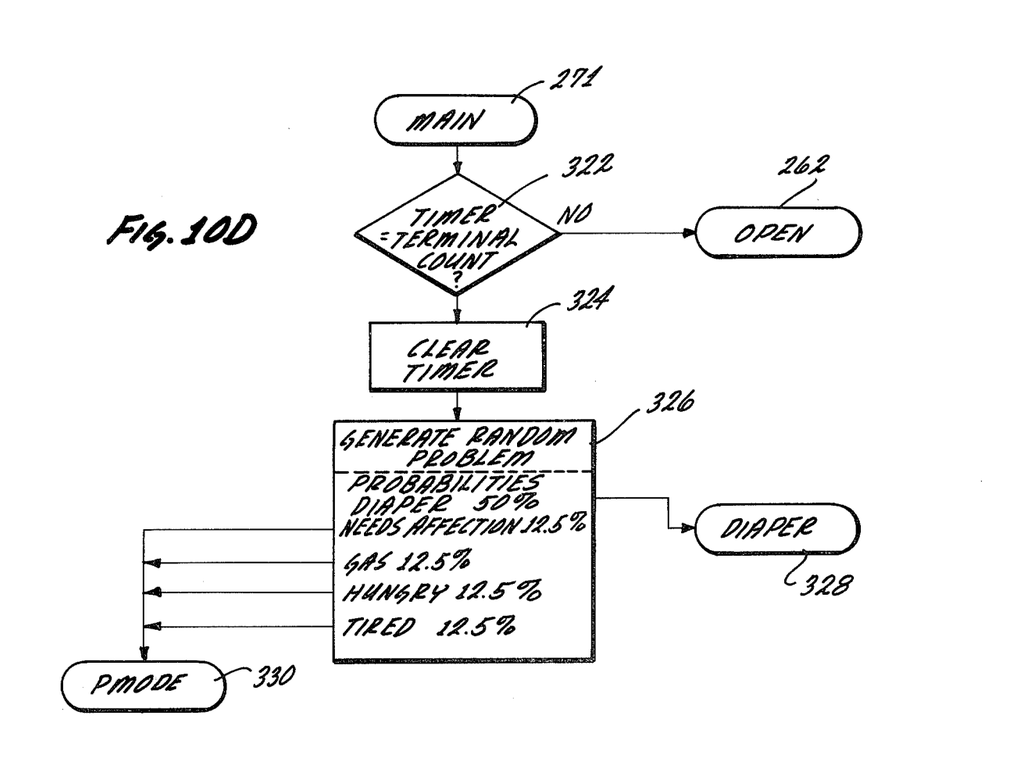

Referring now to FIG. 10D, the main program starts at step 271 and moves to step 322 to determine if the time equals the terminal count; if not, the program branches to step 262 to initiate the "open" mode described in connection with FIG. 10A. If the timer equals the terminal count at step 322, the program proceeds to step 324 where the timer is cleared. The program then moves to step 326 where a random problem is generated. As shown by the probabilities, there is a 50% chance that doll 11 will develop a problem that requires changing its diaper. If this occurs, the program branches to step 328 to initiate a "diaper" mode. This mode will be described in connection with FIG. 10E.

At step 326, there is a 12.5% chance that doll 11 will develop either (1) a need for affection, (2) a gas problem, (3) a hunger problem or (4) a sleepiness problem. Should any of those four problems develop the program branches to step 330 to initiate a "P" mode. This mode will be described in connection with FIG. 10F.

Figure 10E:
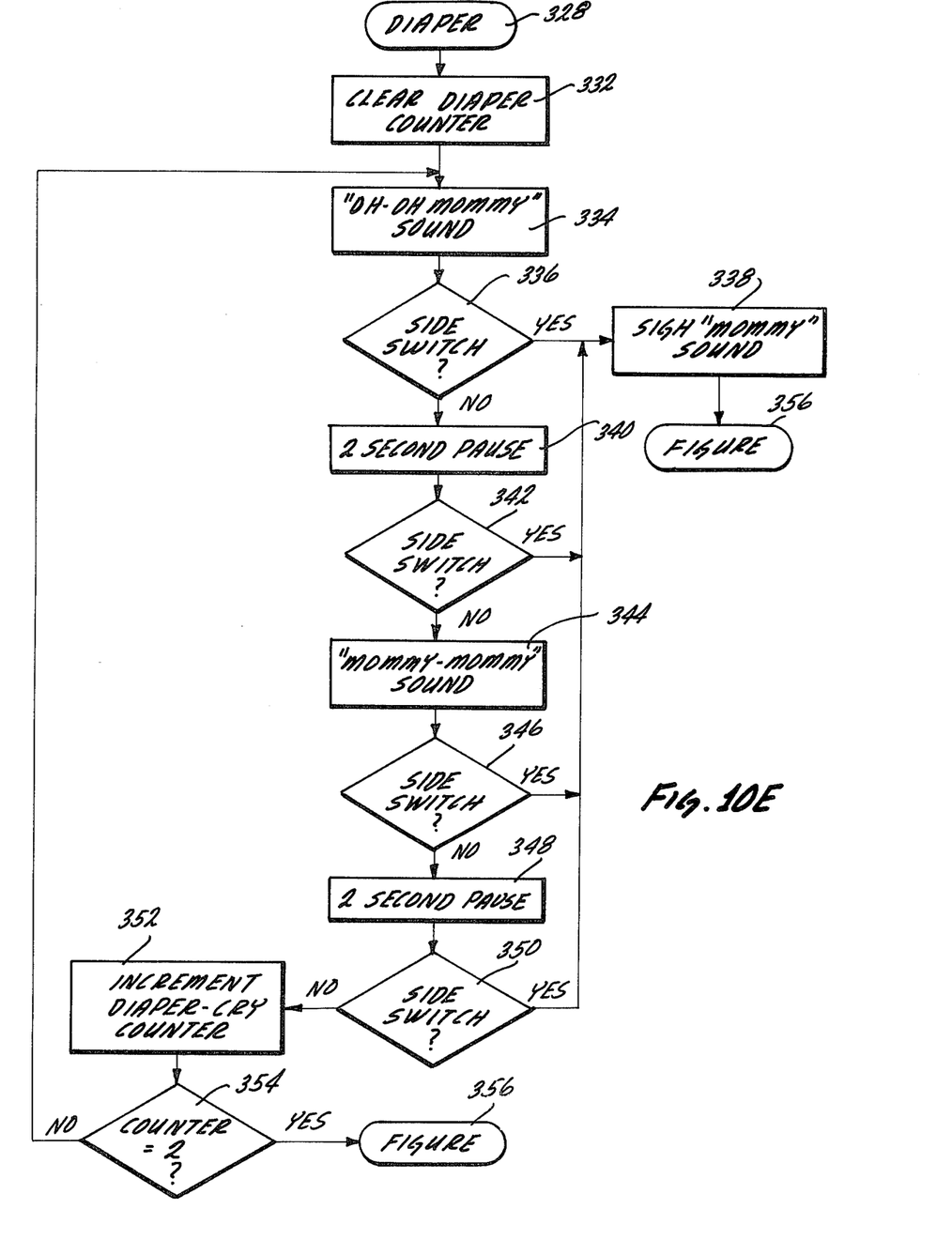

Referring now to FIG. 10E, in the "diaper" mode, doll 11 alternates two cries: "uh-oh, mommy" and "mommy-mommy", and intersperses two second pauses. If side switch 196 is pushed during the sequence (indicating a diaper change), doll 11 sighs and says "mommy" happily to indicate that the problem has been solved. If four cries and two pauses occur without a correct switch input, a new random terminal count is derived and the program returns to "open" mode (step 262).

The "diaper" mode starts at step 328 and proceeds to step 332 where the diaper counter is cleared. The program then moves to step 334 where phonograph 10 plays "uh-oh, mommy". The program then proceeds to step 336 to determine if side switch 196 has been actuated; if so, the program branches to step 338 where phonograph 10 plays a sigh sound and says "mommy" happily. If side switch 196 was not depressed at step 336, the program moves to step 340 for a two second pause. The program then proceeds to step 342 to again determine if side switch 196 was depressed; if so, the program branches to step 338. If side switch 196 was not depressed, the program moves on to step 344 where phonograph 10 plays "mommy-mommy". The program then proceeds to step 346 to see if side switch 196 was depressed; if so, the program branches to step 338. If side switch 196 was not actuated at step 346, the program moves to step 348 for a two second pause. The program then proceeds to step 350 to determine if side switch 196 was actuated; if so, the program branches to step 338. If side switch 196 was not actuated at step 350, the program moves to step 352 where a diaper-cry counter is incremented, whereupon the program moves to step 354 to determine if the count in the diaper-cry counter equals two. If the counter does not equal two, the program recycles to step 334 where doll 11 again says, "uh-oh, mommy". If the counter equals two at step 354, the program branches to step 356 which initiates the routine at step 318 (FIG. 10C) where a terminal count is randomly derived for the timer. The program also branches to step 356 from step 338.

Figure 10F:
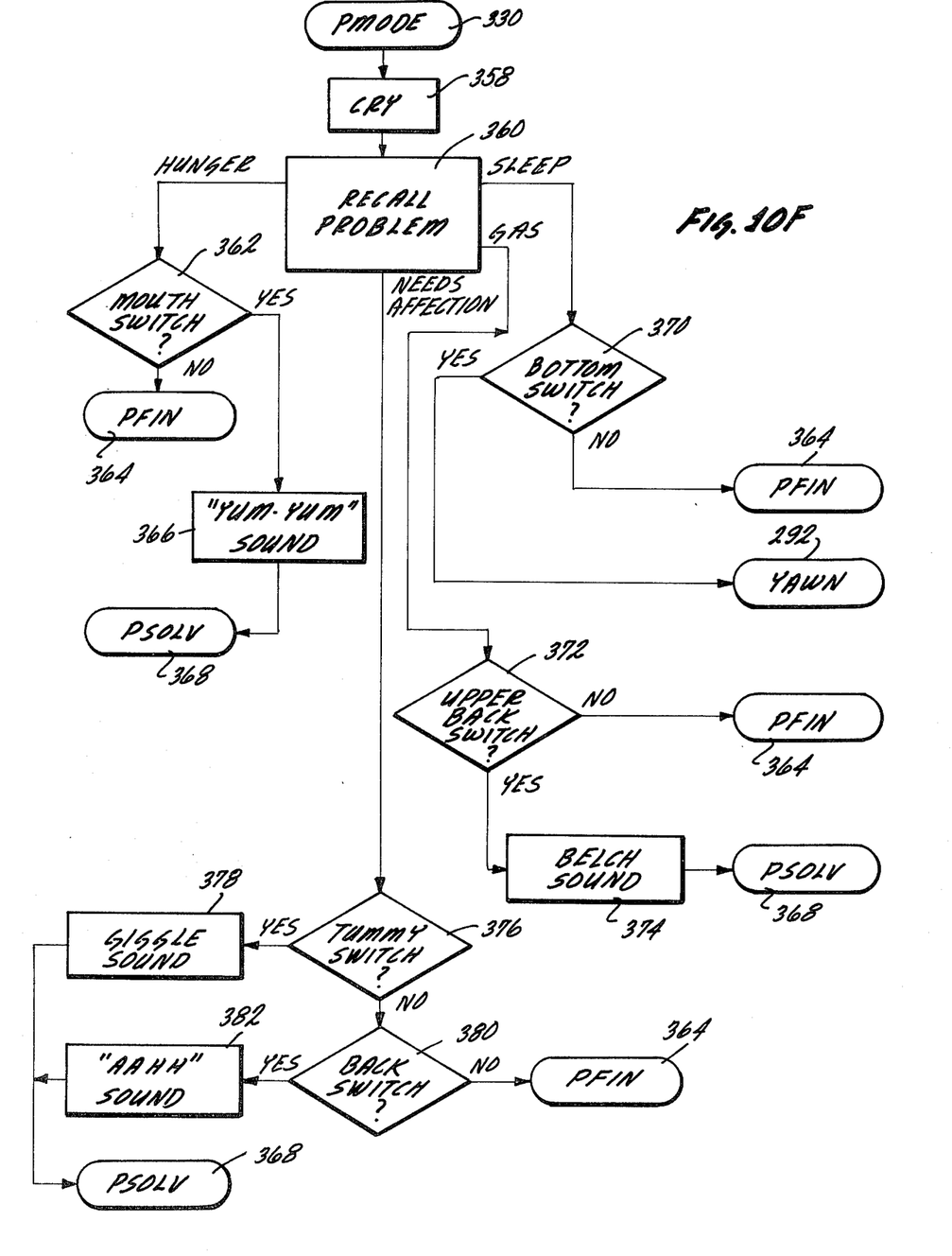

Referring now to FIG. 10F, when doll 11 enters "P" mode, it alternate two cries until a switch is pushed; or until nine cries have occurred, in which case it says, "night-night" and goes to sleep. If an incorrect switch is pushed, the doll responds with the proper sounds as shown on the flowchart. After the "night night" response to the sleepiness problem, the doll goes to sleep. After correct responses to the other three problems, doll 11 sighs and says "mommy" happily to indicate that the problem has been solved. A new random terminal count is derived and doll 11 returns to "open" mode.

The "P" mode is initiated at step 330 and then proceeds to step 358 where phonograph 10 plays a crying sound. Two different cries are alternated to provide variety. Switch inputs are read while the doll is crying. The program then proceeds to step 360 where the problem is recalled. If the hunger problem is recalled, the program moves to step 362 to determine if the mouth switch 188 was actuated. If switch 188 was not actuated, the program moves to step 364 to initiate a "problem-finding" subroutine, which will be described hereinafter in connection with FIG. 10G. If it is determined at step 362 that mouth switch 188 was actuated, the program progresses to step 366 where phonograph 10 plays a "yum-yum" sound. The program then proceeds to step 368 where the "problem-solved" sub-routine of FIG. 10H is initiated.

If the sleepiness problem is recalled at step 360, the program proceeds to step 370 to determine if bottom switch 198 was actuated. If switch 198 was not actuated, the program moves to step 364 where the "problem-finding" sub-routine is initiated. If bottom switch 198 was actuated, the program proceeds to step 292 to initiate the "yawning" sub-routine of FIG. 10B.

If the gas problem was recalled at step 360, the program moves to step 372 to determine if upper back switch 190 was depressed; if so, the program moves to step 374 where phonograph 10 plays a "belch" sound. The program then proceeds to step 368 to initiate the "problem-solved" sub-routine. If it is determined at step 372 that upper back switch 190 was not actuated, the program branches to step 364 to initiate the "problem-finding" sub-routine.

If the "needs affection" problem was recalled at step 360, the program progresses to step 376 to determine if tummy switch 174 was actuated; if so, the program moves to step 378 where phonograph 10 plays a giggle sound. The program then proceeds to step 368 to initiate the "problem-solved" sub-routine. If switch 174 was not actuated at step 376, the program proceeds to step 380 to determine if back switch 194 was depressed; if so, the program moves to step 382 where phonograph 10 plays an "aahh" sound. The program then proceeds to step 368 to initiate the "problem-solved" sub-routine. If back switch 194 was not actuated at step 380, the program moves to step 364 where the "problem-finding" sub-routine is initiated.

Figure 10G:
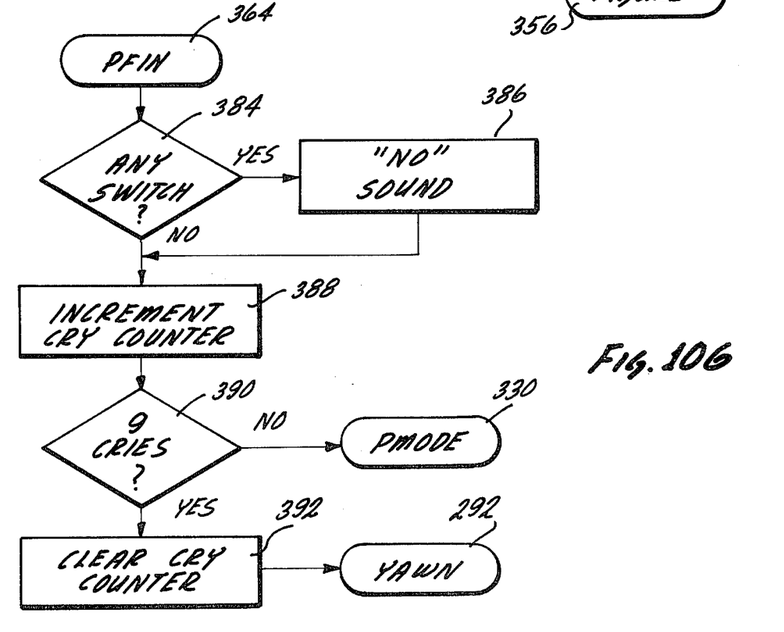
Figure 10H:
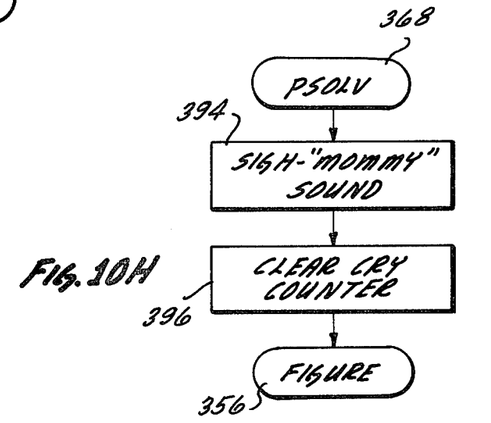

Referring now to FIG. 10G, the "problem-finding" sub-routine is initiated at step 364 any time the correct switch is not actuated during the "P" mode and moves to step 384 to determine if any other switch was actuated. If a switch was actuated, the program moves to step 386 where phonograph 10 plays a "no" sound. The program then moves to step 388 where the cry counter is incremented. If no switch was actuated at step 384, the program proceeds directly to step 388. After the cry counter has been incremented, the program moves to step 390 to determine if nine cries have been executed at step 358. If nine cries have not been executed at step 358, the program recycles to step 330 to again initiate the "P" mode. If it is determined at step 390 that nine cries have been executed, the program moves to step 392 where the cry counter is cleared. The program then moves to step 292 where the yawning sub-routine of FIG. 10B is initiated.

The "problem-solved" sub-routine will now be described in connection with FIG. 10H. Whenever a problem is solved during the "P" mode routine, the program branches to step 368 to initiate the "problem-solved" routine. The program then proceeds to step 394 where phonograph 10 plays a sighing sound and says "mommy" happily to indicate that the problem has been solved. The program then proceeds to step 396 where the cry counter is cleared. The program then branches to step 356 (FIG. 10C) which initiates the sub-routine for figuring a new terminal count. The program moves from step 356 to step 318 where a new terminal count is randomly derived for the timer. The program then moves to step 320 where the timer is cleared. The program then recycles to step 271 to initiate the main program.

While the particular interactive communicating device herein shown and described in detail is fully capable of attaining the objects and providing the advantages hereinbefore stated, it is to be understood that it is merely illustrative of the presently-preferred embodiment of the invention and that no limitations are intended to the details of construction or design herein shown other than as defined in the appended claims which form a part of this disclosure.

Whenever the term "means" is employed in these claims, this term is to be interpreted as defining the corresponding structure illustrated and described in this specification or the equivalent of the same.

We claim:

1. An interactive communicating device comprising:
   (1) a housing in the shape of a figure toy;
   (2) means mounted in said housing for storing a plurality of audible messages;
   (3) play means connected to said message storing means for selectively playing individual ones of said plurality of audible messages;
   (4) a plurality of switches located on said housing; and
   (5) control means including a central processor, having a stored program of coded instructions, coupled to said plurality of switches and said play means, said control means also including:
      (a) means for operating said device in a first mode in which each of said switches within said plurality of switches causes said play means to play a particular respective one of said audible messages;
      (b) means for operating said device in a second mode in which a plurality of problem-solution pairs exist wherein a selected one of said messages is played announcing a problem and a corresponding one of said switches is exclusively selected to effect the corresponding proper solution upon activation by the user, including means for establishing a respective weighted probability of the occurrence of the announcement of each of said problems, and selection of said selected message is thereby established; and
      (c) mode control means for changing between said first and said second modes of operation.

2. A device as set forth in claim 1 wherein said mode control means includes means, operative in said first mode, for counting the number of consecutive interactions of switch operation and messages responses and changing to said second mode whenever a predetermined number of consecutive message responses is reached.

3. A device as set forth in claim 1 wherein said mode control means includes means, operative in said first mode, for establishing a time interval and means operative upon entrance into said first mode for changing to said second mode after said time interval passes.

4. A device is set forth in claim 3 wherein said mode control means further includes means, operative in said first mode, for counting the number of consecutive interactions of switch operation and message responses and changing to said second mode whenever a predetermined number of consecutive message responses is reached.

5. A device as set forth in claim 4 wherein said mode control means includes means, operative in said second mode, for counting the number of consecutive incorrect switch responses to each problem and returning to said first mode when a predetermined number is reached.

6. A device as set forth in claim 1 wherein said device is a doll and said housing is a body resembling a human infant, said doll including automatic shut off means, operative in said second mode, which portrays an infant crying itself to sleep by establishing a time interval and deactivating said control means in the absence of switch operation during said time interval.

7. A device as set forth in claim 1 further including means, operable in said second mode, for producing a negative audible response for each incorrect switch operation.

8. A device as set forth in claim 1 wherein said message storing means comprises a phonograph record and wherein said play means includes a tonearm, a stylus and a speaker cone.

9. A doll for interactive play with a child comprising:
   (1) a body resembling a human infant;
   (2) a record having a plurality of spiral tracks and lead-in grooves, said tracks having impressed thereon human speech messages;
   (3) a record player housed within said body supporting said record and having means for turning said record, a stylus, and means for selectively placing said stylus so as to be carried into a selected one of said tracks;
   (4) a plurality of switches positioned about said body each corresponding to a type of infant care and placed such that a child playing with said doll can operate each of said switches as each corresponding infant care activity is immitated; and
   (5) control means, including a microprocessor and associated stored program, electrically coupled to said plurality of switches and said record player and having:
      (a) means for operating said doll in a first mode in which said record player plays a different message in response to operation of each of said switches;
      (b) means for operating said doll in a second mode in which a crying message is played depicting an unhappy infant which prompts the child playing with said doll to perform acts simulating infant care activities attempting to terminate the crying message, and in which a selected one of said switch operations is designated as the correct one to be operated and others as incorrect;
      (c) means for causing said record player to play a recorded message rebuffing incorrect attempted infant care activities and replaying said crying message;
      (d) means establishing a weighted probability as to the likelihood of designating each of said switches as the correct switch;
      (e) means for simulating an infant crying itself to sleep having means establishing a time interval for receiving switch operation and means deactivating said control means and said record player in the absence of switch operation for said interval; and
      (f) means for switching the operation of said doll between said first and second modes.

* * * * *